Patented Oct. 13, 1936

2,057,144

UNITED STATES PATENT OFFICE 2,057,144

PROCESS FOR MANUFACTURE OF VINEGAR

Eugene G. Grab, Winchester, Va., assignor to Food and Fruit Industries, Inc., Winchester, Va., a corporation of Delaware No Drawing. Application April 6, 1934, Serial No. 719,403

13 Claims. (Cl. 99—147)

This invention relates to a new process for the manufacture of vinegar, the primary object of the invention being the provision of a process for the production of vinegar of a superior quality in a short period of time under conditions which will not create a loss of the odorous esters and aldehydes and other bodies forming the bouquet of the vinegar.

A further object of the invention resides in the provision of a process which will provide in the vinegar more acidity than is usually provided in the present known methods of quick generation, and further a process which involves less labor in the handling of the materials, will minimize evaporation of the product and which will enable the product to be produced at a materially reduced cost.

Still another object of the invention is the provision of a process wherein substantially no mother of vinegar is produced in the practicing of said process.

In the practicing of my process, preferably hard cider is first produced although sweet juice may be used. Hard cider is produced in the usual or any preferred manner, such as by pressing the apples and obtaining the usual light cider, heating the same to 80° or 85° F. and adding one pound of compressed yeast to five thousand gallons of the cider. This cider is retained in a tank at a temperature of about 70° F. and, of course, vigorous fermentation occurs so that within two or three weeks, it is ready for use. This may be filtered and/or pasteurized to remove any contaminations or impurities.

I then produce a vinegar solution of gelatin by dissolving one gram of edible gelatin in powdered form in 160 ml. of new vinegar at 90° F. fully impregnated with the desired bacteria. This is the preferable gum solution used, although I do not wish to be limited to these specific ingredients and proportions thereof, as others can be equally well used, as for instance, agar-agar, isinglass and the like, together with edible acids.

To each gallon of hard cider, there is added 20 ml. of the gelatin-vinegar solution above mentioned, or such other gum solution as may be used, and thoroughly mixed in any preferred manner, this mix being retained at from 70° to 85° F. through the medium of direct or indirect heating, or otherwise. The introduction of this gelatin-vinegar solution, or such other similar solution as may be used, in the hard cider forms a colloidal solution and as a result of this colloidal condition, there is provided an infinite number of particles or surfaces in the liquid upon which the bacteria react with the alcohol. This colloidal solution is a protein body which promulgates growth and multiplication of the bacteria and aids in the life cycle thereof.

This mix is allowed to stand, under the retained temperature of from 70° to 85° F., with or without the continuous or intermittent addition of air or oxygen heated to 70° to 85° F. or not heated, as may be found desirable, until all alcohol has been converted into acetic acid, the same being tested from time to time by titrating with a standard alkali solution. The tank in which the vinegar stock is contained for the formation of the product is allowed to remain open for a limited period of time as for instance, several days, whereupon the same is closed to avoid evaporation and the tank retained closed until the vinegar is completely formed.

During the acetification process, I have found that substantially no "mother" is formed. If there is a light film formed on the surface at the early stage of this process, the same is promptly broken up by mixing with the contents of the tank. As the stock turns to vinegar, the mix will gradually clear and I have found that within approximately sixty days, under optimum conditions, superior vinegar with a high percentage of acetic acid and a fine bouquet will be formed. After the vinegar is formed in the tank under the conditions outlined above, the same is filtered off to remove the sediment and whatever suspended matter may be present.

Through the medium of my improved process, it will be seen that the stock from which the vinegar is produced is under the direct control, chemically and physically, of the operator at all times as distinguished from the present "quick generator" process wherein it becomes necessary to await the discharge of the vinegar from the generator in order to determine the efficiency of the generator and the remedies necessary to improve the same.

It will be seen from the foregoing description that I have provided a simple, comparatively inexpensive, and efficient process for the manufacture of vinegar, the resultant product obtainable under this process being of superior quality created in a comparatively short period of time and without a loss of the odorous esters and aldehydes forming the bouquet of the vinegar.

Various changes in materials and the proportions thereof may be made without departing from the spirit or sacrificing any of the principles of the invention.

Having thus described the invention, what is claimed is:

1. A process for the manufacture of vinegar, including the step of adding an edible colloidal solution made by dissolution or simple precipitation to cider.

2. A process for the manufacture of vinegar, including the step of adding a gum solution to cider.

3. A process for the manufacture of vinegar, including the step of adding an edible gummy or gelatinous substance for creating a colloidal condition in cider through the medium of dissolution or simple precipitation.

4. A process for the manufacture of vinegar, including the steps of mixing an edible gummy or gelatinous substance with cider whereby to create through means of dissolution or simple precipitation a colloidal condition therein and retaining the mix at a predetermined temperature until the alcohol therein has been converted to acetic acid.

5. A process for the manufacture of vinegar including the steps of mixing an edible colloidal solution obtained by dissolution or simple precipitation with cider and retaining the mix at a predetermined temperature until the alcohol therein has been converted to acetic acid.

6. A process for the manufacture of vinegar including the step of mixing a gelatin-vinegar solution with cider.

7. A process for the manufacture of vinegar, including the steps of mixing a gelatin-vinegar solution with cider and retaining the mix at a predetermined temperature until the alcohol therein has been converted into acetic acid.

8. A process for the manufacture of vinegar, including the steps of mixing an inert colloidal solution obtained by dissolution or simple precipitation with hard cider, retaining the mix at a predetermined temperature for the period necessary to permit the alcohol therein to be converted to acetic acid and filtering off suspended matter.

9. A process for manufacturing vinegar, including the steps of mixing a gum solution with hard cider, retaining the mix at a predetermined temperature for the period of time necessary to convert the alcohol into acetic acid and filtering off suspended matter in the mix.

10. A process for the manufacture of vinegar, including the steps of mixing a gelatin-vinegar solution with hard cider, retaining the mix at a predetermined temperature for the period of time necessary to convert the alcohol therein to acetic acid and filtering off the suspended matter.

11. A process for the manufacture of vinegar, including the production of hard cider, the mixing therewith of an edible colloidal solution obtained by dissolution or simple precipitation and the retention of the mixture at a predetermined temperature for the period of time necessary to convert the alcohol therein to acetic acid.

12. A process for the manufacture of vinegar, including the production of hard cider, the mixing of a gum solution therewith to create a colloidal condition therein, and retention of the mixture at a predetermined temperature for such time as may be necessary to convert the alcohol therein to acetic acid.

13. A process for the manufacture of vinegar, including the production of hard cider, the mixing of a gelatin-vinegar solution therewith to create a colloidal condition therein, and retention of the mixture at a predetermined temperature for such time as may be necessary to convert the alcohol therein to acetic acid.

EUGENE G. GRAB.